Sept. 9, 1969 W. M. DE MAIR 3,465,596
INDICATOR ELEMENT FOLLOWER STRUCTURE
Filed Oct. 2, 1967 6 Sheets-Sheet 1
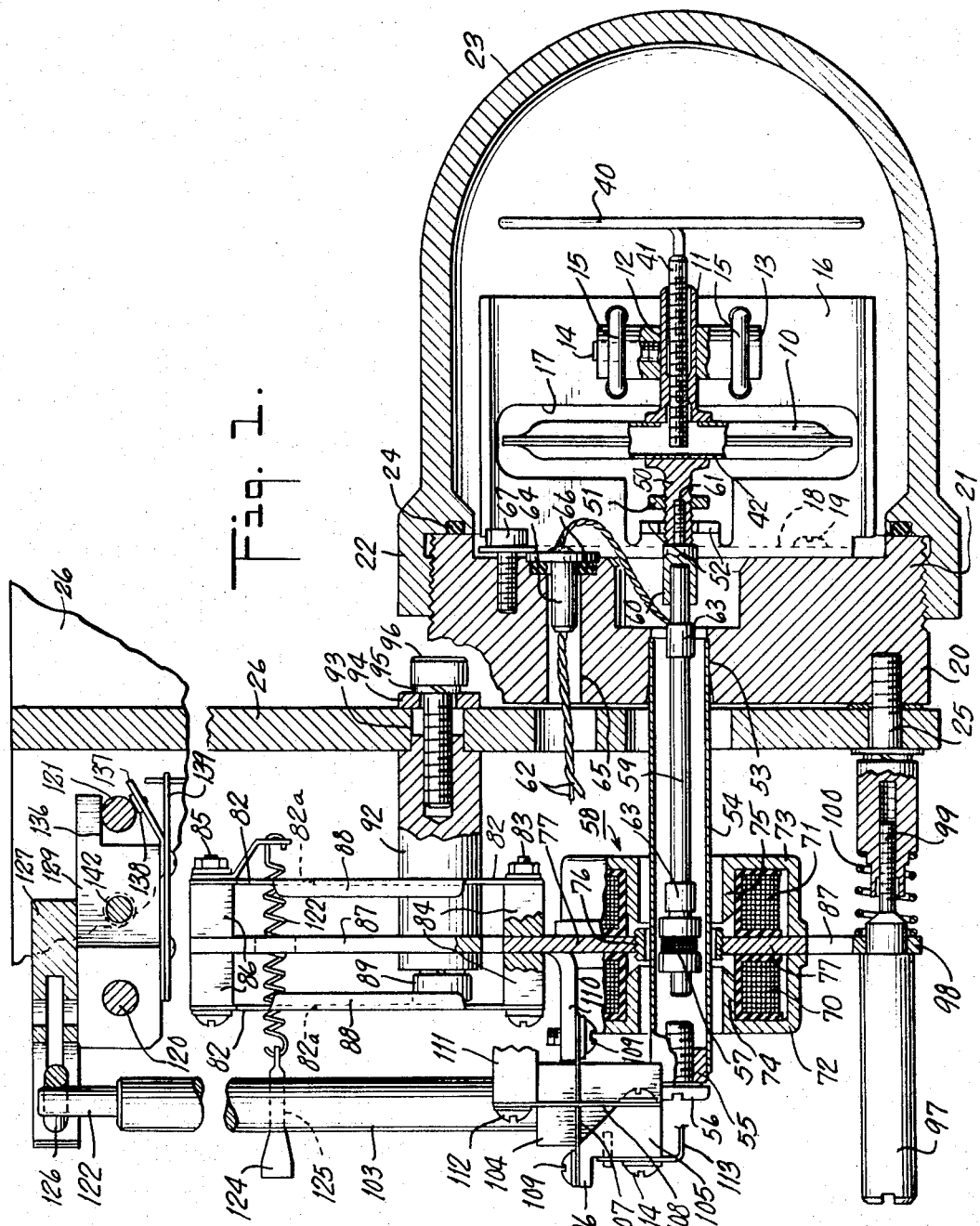
Fig. 1.
INVENTOR.
WILLIAM M. DE MAIR
BY
ATTORNEY

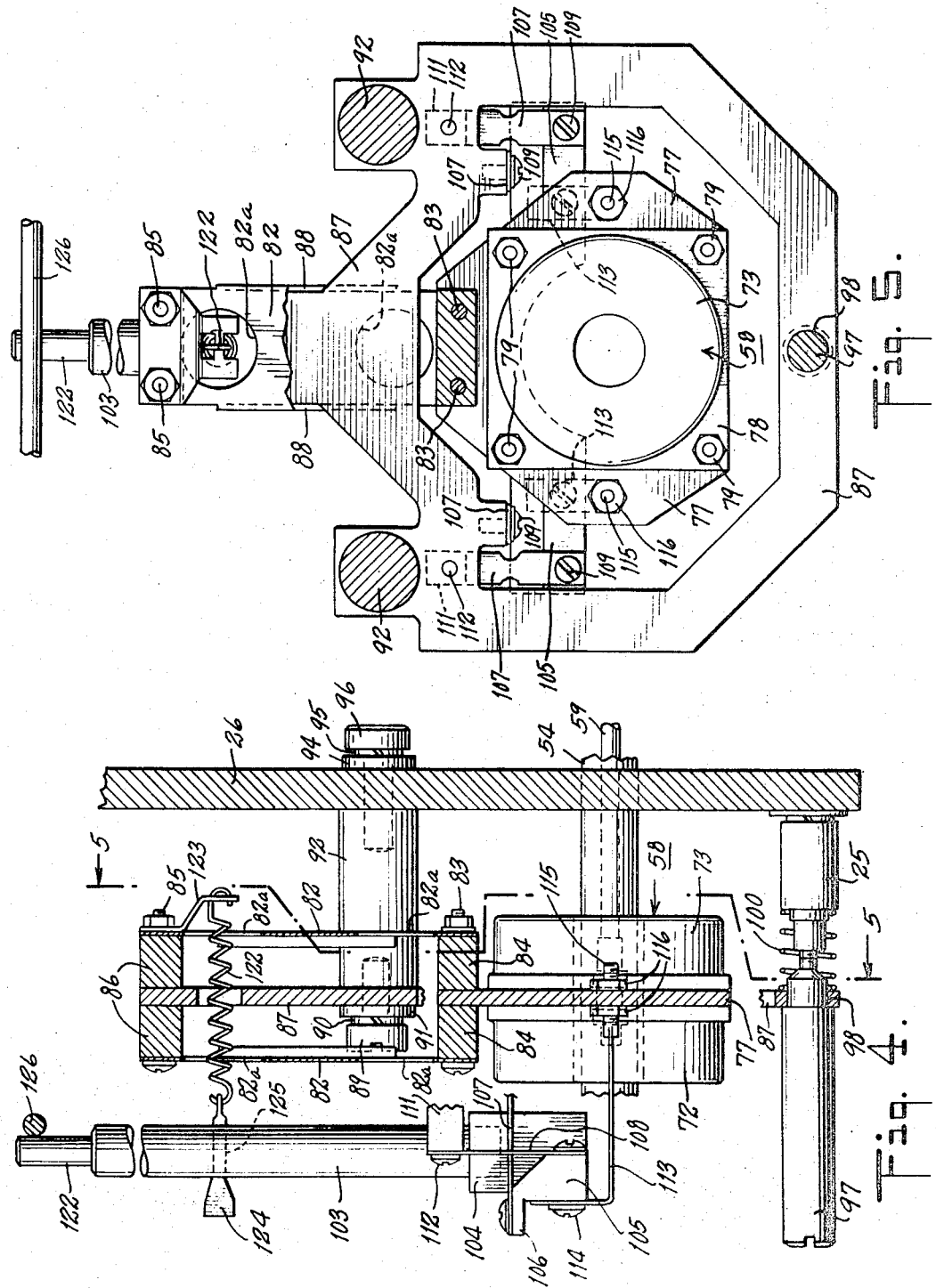

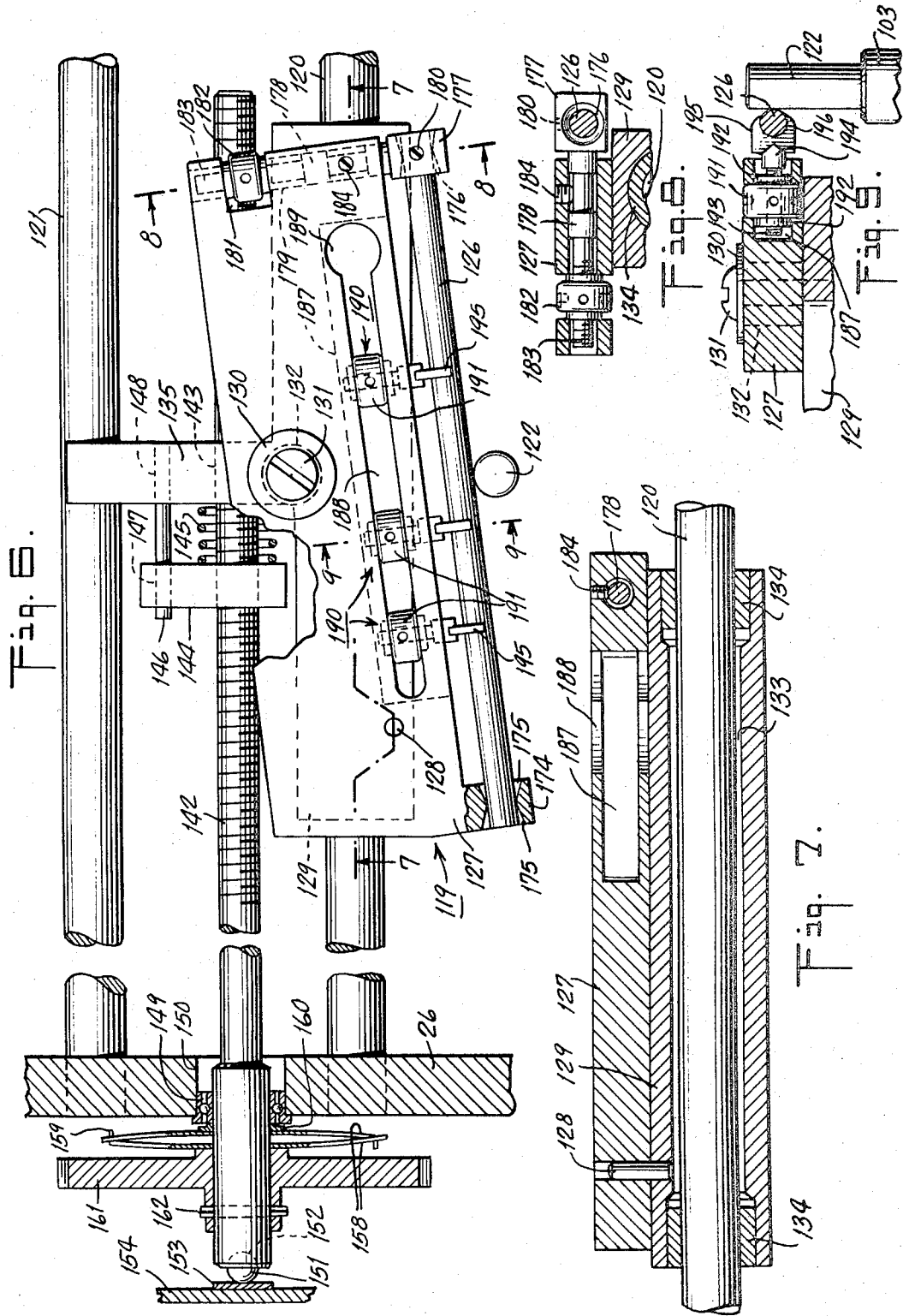

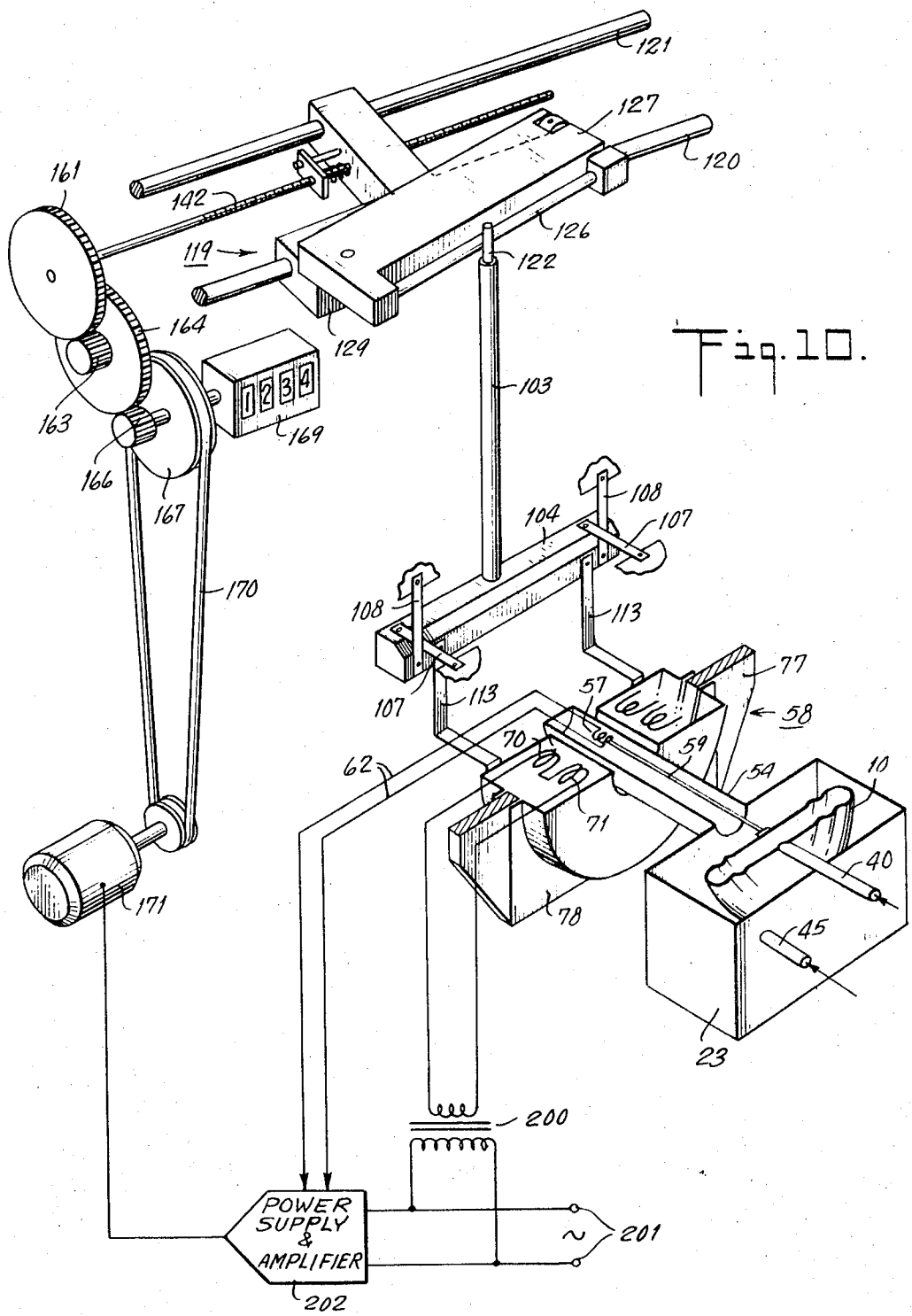

United States Patent Office 3,465,596
Patented Sept. 9, 1969

3,465,596
INDICATOR ELEMENT FOLLOWER STRUCTURE
William M. De Mair, Rutherford, N.J., assignor to Wallace & Tiernan Inc., East Orange, N.J., a corporation of Delaware
Filed Oct. 2, 1967, Ser. No. 672,322
Int. Cl. G01f 15/14; G01j 5/02; G01k 1/08
U.S. Cl. 73—432                                         14 Claims

ABSTRACT OF THE DISCLOSURE

A device for following and indicating the posi.ion of a moveable element of a condition responsive device. Means are provided for sensing changes in position of the moveable element and for driving a follower element so that the positional relationship between the moveable element and the follower element remains the same. The drive linkage includes a motor, indicator for registering the extent of movement of the motor, and an adjustable wedge shaped reciprocating cam for adjusting the span of the indicator and for compensating for non-linearity of the overall device.

---

The present invention relates to indicator element follower structures and, more particularly, to such structures suitable for servo-motor system applications wherein the essentially effortless and highly sensitive positioning of an indicator element according to changes of a condition to be indicated is used so to control the servo system as to effect servo-controlled power-driven actuation of a follower element to follow the indicator element and thereby indicate the prevailing value of the indicated condition.

It is an object of the invention to provide an indicator element follower structure of relatively simple and sturdy construction yet one characterized both by high sensitivity of follower action and by consistent accuracy in repetitive follow operations.

It is a further object of the invention to provide an indicator element follower structure wherein a follower element is caused to follow in sensitive manner and with high precision small incremental movements of an indicator element and does so without signficant reaction upon, or signficant loading of, the indicator element.

It is an additional object of the invention to provide an indicator element follower structure operationally free of significant lost motion and devoid of any frictional pivotal support of its movable follower components and thus one providing maximized repeatability in its follower action.

It is yet a further object of the invention to provide an indicator element follower structure wherein a follower cam element provides a cam surface the rise of which can be easily and readily selected and thereafter adjusted at will to enable span adjustment of follower motion corresponding to large variations in the range of movement required of the indicator element in differing ones of numerous applications in which the structure may be used.

It is another object of the invention to provide an indicator element follower structure which may readily be constructed to have both a high degree of static balance for differing orientations of the structure in operation or from application to application and also to have a high degree of dynamic balance lessening the otherwise undesirable effect of shock and vibration to which the structure may be subjected in operation.

Other objects and advantages of the invention will appear as the detailed description thereof proceeds in the light of the drawings forming a part of this application and in which:

FIG. 1 illustrates a partially cross-sectioned end view, FIG. 2 an elevational front view, and FIG. 3 a partially cross-sectioned plan view of an indicator element follower structure embodying the present invention in a particular form;

FIGS. 4 and 5 are enlarged fragmentary views illustrating certain details of the follower structure;

FIGS. 6–9 are enlarged fragmentary plan and cross-sectional views illustrating the construction of a cam-follower carriage utilized in the follower structure herein described; and FIG. 10 schematically shows a representative servo system utilizing the indicator elements follower structure hereinafter described.

Figure 2:
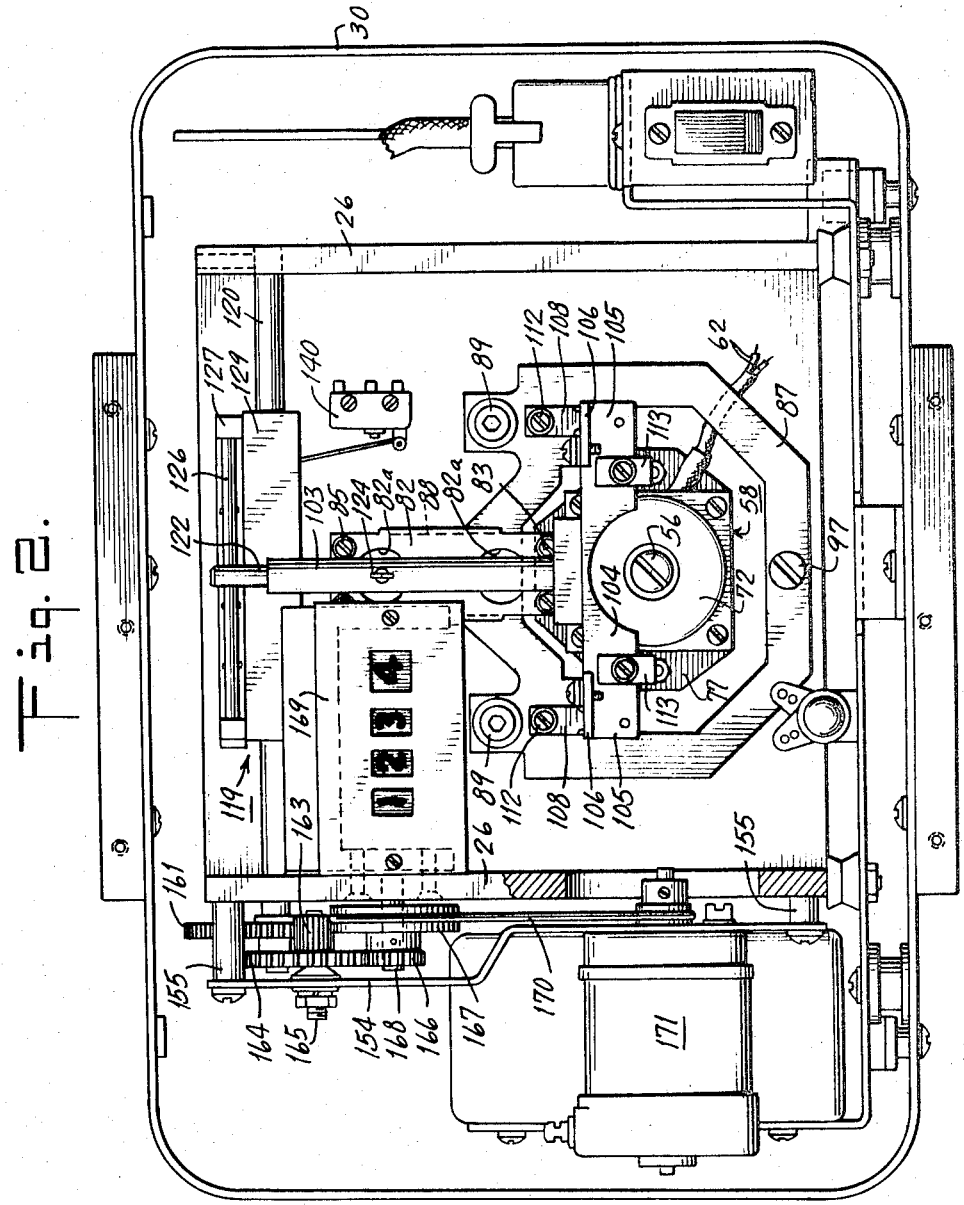
Figure 3:
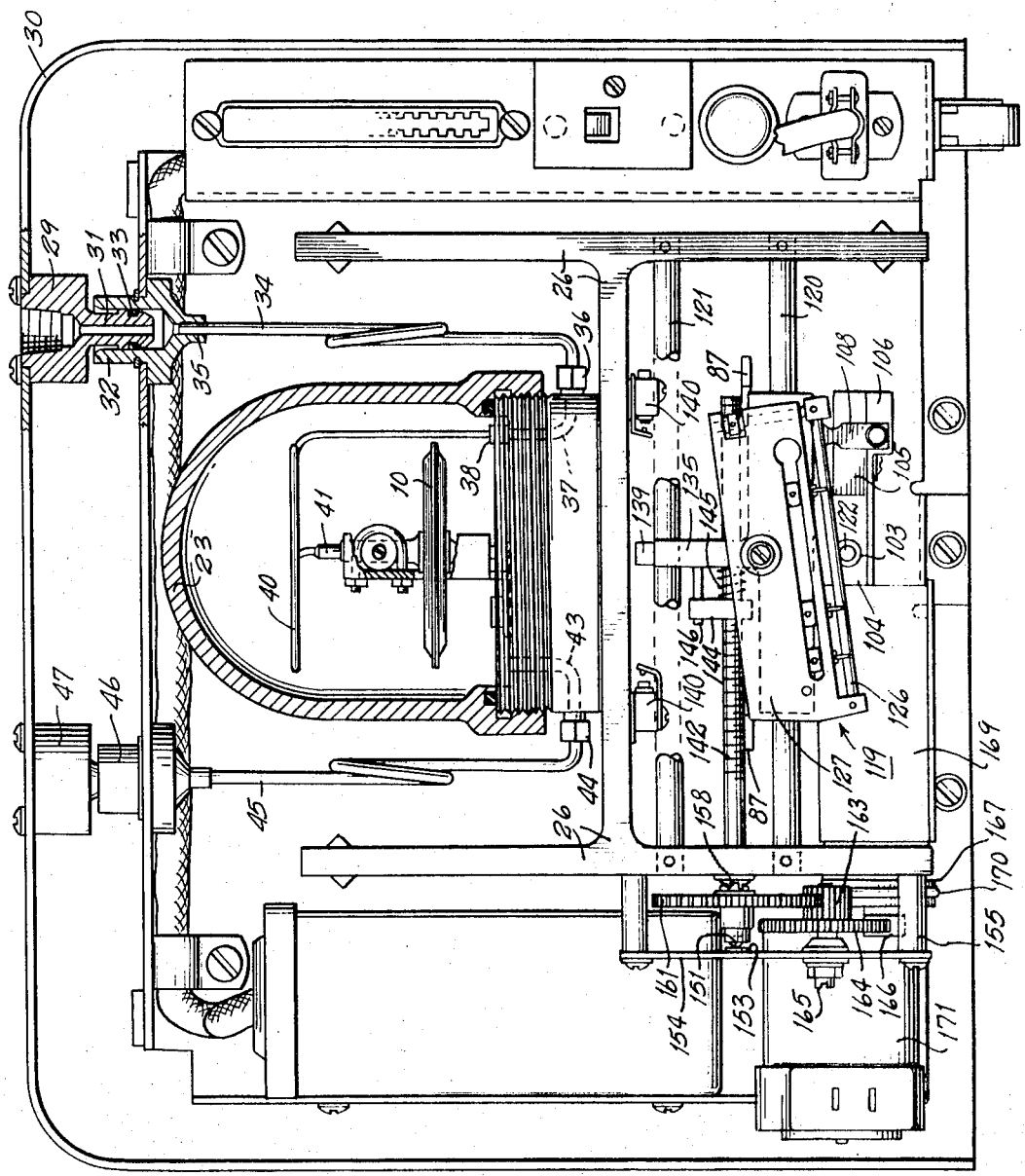

Referring now more particularly to FIGS. 1–3 of the drawings, an indicator element follower structure embodying the invention is illustrated by way of example as used in association with a pressure sensitive capsule 10 for indicating changes of a differential pressure. The capsule 10 is of conventional construction and includes a hollow support stem 11 which extends through a diametrical aperture 12 of a cylindrical support member 13 and is axially adjustably secured in position in the latter by a set screw 14. The support member 13 is affixed by U-clamps 15 to a support bracket 16 which has an elongated aperture 17 to receive the capsule 10 and is secured by a depending flange 18 and spaced machine screws 19 to an enclosing housing base member 20. The latter has an externally screw-threaded end portion 21 which receives the internally threaded and shoulder end 22 of a dome-shaped cylindrical housing 23, a resilient O-ring 24 providing an hermetic seal between the housing 23 and base member 20. The latter is mounted by machine screws including a shouldered stud 25 on a base member 26 of I-shaped cross section upon which the indicator element follower structure is assembled.

A conduit assembly enables supply of pressurized vapor or gas to the interior of the capsule 10. This assembly includes a nipple coupling member 29 (FIG. 3) carried by an enclosing housing 30 secured to the base member 20 by means not shown. The nipple 29 includes a hollow cylindrical end extension 31 which is telescopically received in an axial bore of a coupling member 32, a resilient O-ring 33 providing an hermetic seal between the members 29 and 32. A hollow tube 34 has one end hermetically sealed in an end bore 35 of the member 32 and has its opposite end connected by a nipple coupling member 36 in hermetically sealed communication with a right-angled port 37 which extends through the base member 20 and terminates in a bushing 38 in the closed chamber 39 provided by the housing 23. A tube 40 has one end hermetically sealed to the bushing 38 and has its opposite end hermetically sealed to a sleeve 41 which extends through and has an hermetically sealed fit within the axial bore of the capsule stem 11, the remote end of the sleeve 41 being spaced a short distance from the movable diaphragm 42 of the capsule 10 to establish a mechanical stop limiting inward collapsible movement of the diaphragm 42. Pressurized vapor or gas is supplied to the chamber 39 through a similar conduit assembly which includes a right-angled port 43, a nipple 44, a tube 45, and telescopic members 46 and 47 having the same construction as the members 29 and 32 and of which the nipple coupling member 47 is supported by the housing 30. An externally threaded stud 50 (FIG. 1) is concentrically affixed to the capsule diaphragm 42 to receive a nut 51 engageable with a forked flange 52 of the support bracket 16 to limit the expansion movement of the diaphragm 42 according to the adjusted position of the nut 51 on the stud 59. The housing base member 20 is provided with an axial bore 53 in which there is hermetically sealed a cylindrical tube 54 fabricated of a conventional material having non-magnetic properties combined with high electrical resistivity such as, for example, Hastelloy Alloy C marketed by the Haynes Stellite Company of Kokomo, Ind. This tube is hermetically closed at its remote end by a bushing 55 hermetically sealed to the tube 54 and having an axial threaded bore to receive an hermetic seal machine screw 56.

The tube 54 encloses an indicator element linearly movable over a range of positions indicative within such range of the prevailing value of the condition (i.e. the differential pressure) to be indicated. This element, for example, may be the movable magnetic core element of a conventional differential transformer but as here shown is preferably comprised by the secondary winding 57 of an inductive transducer 58 which is more fully disclosed and claimed in the Booth application Ser. No. 672,040 filed concurrently herewith and assigned to the same assignee as the present application. The secondary winding 57 is wound axially on and near the end of a rod 59 of electrical insulating material which is supported by a metal coupling 60 having an axial threaded projection 61 received in an internally threaded axial bore of the stud 50. During assembly, a tool inserted through the bore of the bushing 55 enables the secondary winding to be properly aligned in the tube 54, after which the screw 56 is threaded into the bushing hermetically to seal the end of the tube. This structure supports the secondary winding 57 for linear movement over a range of positions, effected by movement of the capsule diaphragm 42, indicative within such range of the prevailing value of a condition to be indicated such as the difference between of the pressures prevailing internally and externally of the capsule 10. The end leads 62 of the winding 57 are secured along the length of the rod 59 by securing bands 63 and extend to the exterior of the housing chamber 39 through the hermetically sealed bore of a flanged bushing 64 inserted in an aperture 65 of the base member 20 and hermetically sealed to the latter by a resilient O-ring 66 under compressive force of spaced retaining machine screws 67 engaging the flange of the bushing 64.

The inductive transducer 58 includes a pair of ring-shaped primary windings 70 and 71 which in operation are electrically energized with alternating current to provide opposing polarity alternating magnetic fields and are enclosed within individual ones of a pair of cup-shaped housing members 72 and 73 of soft iron. The latter are fabricated with inner, concentric, magnetic pole members 74 and 75 having their ends spaced by small air gaps from a concentric aperture 76 of a soft iron plate 77 shown more clearly in FIG. 4. The cup-shaped members 72 and 73 have lip flanges 78 of rectangular periphery, as shown more clearly in FIG. 5, by which they are secured on opposite sides of the plate 77 by corner machine screws 79. The cup-shaped members 72 and 73 and the plate 77 provide in the transducer 58 a magnetic structure which develops in the air gaps between the ends of the pole members 74 and 75 and the plate 77 opposed-polarity air-gap magnetic fields of symmetrical axial configuration at the region of the secondary winding 57. So long as the secondary winding 57 is located symmetrically with respect to the plane of symmetry of these air-gap magnetic fields, no alternating voltage appears at the terminals of the secondary winding. Any collapse or expansion motion of the capsule diaphragm 42 with change of differential gas or vapor pressures prevailing within and without the capsule effects a corresponding linear displacement of the secondary winding 57 to one side or the other of the plane of symmetry of the transducer air-gap magnetic fields. An alternating voltage is thereupon induced in the secondary winding 57, the amplitude of the voltage varying with the magnitude of the winding displacement and the relative phase of the induced voltage varying with the sense of the winding displacement more fully into one or the other of the air-gap magnetic fields. This induced voltage is supplied to a servo system presently to be described, which operates to cause follow motion of the transducer magnetic structure in such direction and to such extent as to move the air-gap magnetic fields to a position of symmetry with the secondary winding 57. When this occurs, the induced voltage in the secondary winding 57 decreases to zero amplitude and the follow motion is halted.

To accomplish such follow motion of the transducer magnetic structure, the transducer 58 is supported for essentially linear motion axially of the air-gap magnetic fields. As shown more clearly in FIGS. 4 and 5, the transducer 58 is supported by a parallelogram support arrangement comprised by longitudinally rigid elongated spring members 82 having their lower ends bolted by machine screws 83 and spacer blocks 84 to the plate 77 of the transducer and having their upper ends similarly bolted by machine screws 85 and spacer blocks 86 to a centrally apertured yoke form of a sub-base member 87. The spring members 82 have stiffening edge flanges 88 and apertures 82a (FIG. 2) centered upon the ends of these flanges to attain greater flexibility and allow the spring members to pivot at definite points near their end regions. The yoke sub-base member 87 is secured by machine screws 89, lock washers 90 and plain washers 91 on the ends of cylindrical spacer members 92. The latter, as shown more clearly in FIG. 1, have reduced end portions inserted in apertures 93 of the base member 26 and are secured in position thereon by plain washers 94, lock washers 95 and machine screws 96. This support of the yoke member 87 permits a limited amount of resilient bending pivotal motion by it about the ends of the spacer members 92 to adjust the magnetic structure of the transducer 58 to attain symmetrical positioning of its air-gap magnetic fields in relation to any desired initial reference calibration position of the transducer secondary winding 57. Such pivotal adjustment is accomplished manually by a shouldered adjustment screw 97 which extends through an aperture 98 in the bottom frame portion of the yoke member and has a screw threaded axial end portion 99 (FIG. 1) received by an internally threaded axial bore of the stud 25. A helical spring 100 maintains the yoke member 87 in engagement with the shoulder of the adjustment screw 97 and takes up any lost motion between the adjustment screw 97 and the stud 25.

Follow motion is imparted to the transducer 58 by cam follower arm 103 fixedly secured to a cross bar 104 having end portions 105 of triangular cross-sectional shape including a laterally extending lip 106. The cam follower arm 103 with its cross bar 104 is pivotally supported from the yoke sub-base member 87 by spaced pairs of cross-flexure springs 107 and 108. The springs 107 are secured by machine screws 109 as shown between the cross bar lips 106 and laterally extending flanges 110 of the sub-base yoke 87, and the springs 108 are similarly secured as shown between the end portions 105 of the cross bar and spacer members 111 affixed by machine screws 112 to the face of the yoke sub-base member 87. These pairs of cross-flexure springs 107 and 108 provide pivotal motion of the cam follower arm 103 about a frictionless, immobile axis of flexure corresponding to the cross-over point of the cross-flexure springs 107 and 108. Pivotal motion of the cam follower arm 103 is translated to essentially linear motion of the magnetic structure of the transducer 58 by a spaced pair of extension arms comprised by L-shaped longitudinally rigid but laterally flexible spring members 113 (FIG. 4). These are secured at one end by machine screws 114 to the end portions 105 of the cross bar 104 as shown, and are secured at their opposite ends to the transducer plate 77 by means of attached end-projecting screw-threaded studs 115 (FIG. 4) and associated nuts 116 which allow adjustable positioning of the magnetic structure of the transducer 58 in relation to any preselected calibration pivotal position of the cam follower arm 103.

Pivotal movement of the cam follower arm 103 is controlled by a carriage 119, having a structure shown more clearly in FIGS. 6–9, which is supported for linear guided movement upon spaced and parallel ways 120 and 121 of cylindrical rod form having their ends supported by the base member 26 (FIG. 1). In particular, the cam follower arm 103 has a cylindrical end portion 122 which is biased into engagement with a cam surface of the carriage 119 by a tension spring 122 (FIG. 1) extending through aligned apertures in the spring members 82 and yoke sub-base member 87. One end of the spring 122 is anchored by a bracket 123 mounted with the right-hand spring member 82 (as seen in FIG. 1) on the yoke sub-base member 87, and the other end of the spring is anchored by an end aperture of an insert 124 extending through an aperture 125 of the arm 103. The cam surface of the carriage 119 is provided by a cam rod 126 comprising one component of a cam structure 127 described more fully hereinafter. The latter is pivotally mounted by a pin 128 on a T-shaped carrier 129 and is fixedly secured in an angularly adjusted position by a plain washer 130 and a machine screw 131 which extends through an enlarged aperture 132 of the member 127 and is threaded into the carrier 129. As shown more clearly in FIG. 7, the carrier 129 is provided with a longitudinal bore 133 having bushing inserts 134 at its ends for guided movement of the carrier 129 on the guide rod or way 120. The T leg 135 of the carrier 129 has an end notch 136, as more clearly shown in FIG. 1, and is maintained in guided engagement with the other cylindrical rod or way 121 by a leaf spring 137 having a plastic insert 138 engaging the rod 121. The spring 137 is secured with a switch-actuating arm 139 effective to operate range limit switches 140 (FIG. 3) used if desired in control of the associated servo system, on the underside of the T leg 135 as shown.

The carrier 129 is reciprocally driven longitudinally of the ways 120 and 121 by a lead screw 142 threaded into a mating internally threaded aperture 143 of the carrier T leg 135. Any lost motion between the threads of the lead screw 142 and the threaded aperture 143 are taken up by a take-up structure. This structure includes a member 144 threaded onto the lead screw 142, a helical wire spring 145 compressed between the member 144 and the T leg 135, and a pin 146 extending through an aperture 147 of the member 144 and secured in an aperture 148 of the T leg 135 thus to prevent rotation of the member 144 on the lead screw after the initial positioning on the latter to compress the spring 145. To permit bend or "whip" of the lead screw 142 as it rotates, without introducing errors in the movement of the carriage 119, the threaded end of the lead screw is supported only by the T leg 135 of the carrier 129 and a second support for the lead screw is provided some distance from its remote end by a ball-bearing assembly 149 received in an aperture 150 of the base member 26. End thrust of the lead screw 142 is taken up by a single ball bearing 151 seated in a hemispherical axial seat 152 of the lead screw 142 and engaging a hardened steel plate 153 affixed to a plate 154 which, as shown more clearly in FIGS. 2 and 3, is supported from the base member 126 by spacer members 155. This single support by the ball bearing 151 of the end of the lead screw 142 allows radial movement of the latter at this end while the support of the lead screw by the carrier 129 allows the lead screw to be radially restrained. The lead screw 142 is preloaded for end thrust by a pair of concave leaf spring members 158 facing one another, as shown in FIG. 6, and restrained against relative rotation by a laterally extending peripheral ear 159 on each which extends through a peripheral radial slot (not shown for simplicity) on the other. These leaf spring members are positioned between a collar 160 abutting the ball-bearing assembly 149 and the hub of a spur gear 161 supported upon the lead screw 142 and affixed by a pin 162 to the latter as shown.

As shown more clearly in FIGS. 2 and 3, the lead-screw spur gear 161 is driven by meshing engagement with a pinion gear 163 formed integral with a spur gear 164 mounted upon a stud shaft 165 secured to the plate 154, the spur gear 164 in turn being driven by a pinion gear 166 formed integral with a pulley 167 secured on the shaft 168 of a digital counter 169 mounted upon the base member 26. The pulley 167 is coupled by a drive belt 170 to a reversible electric motor 171 supported upon the plate 154. The reversible energization of the electric motor 171, to effect reversible linear drive of the cam carriage 119, is effected by a servo system presently to be described.

Referring once again to FIGS. 6–9, the cam structure 127 is disclosed and claimed in a DeMair et al. application Ser. No. 672,043 filed concurrently herewith and assigned to the same assignee as the present application. As earlier mentioned, the cam structure 127 is pivotally mounted by the pin 128 for angular adjustment on the carrier 129 and is secured in adjusted angular position on the latter by the machine screw 131. This angular adjustment enables the follower structure of the invention to be used in various applications wherein the indicator element in a given application may move, in response to the condition to be indicated, over a substantially larger or smaller range than would be the case in another such application utilizing the present structure. The angular adjustment of the cam structure 127 on the carrier 129 essentially provides a coarse adjustment of the range of angular pivotal motion of the cam follower arm 103, and thus the range of follower movement of the magnetic structure of the transducer 58, for a given range of movement of the carriage 119. This provides a span adjustment which, in the particular application herein described by way of example, correlates the range of movement of the carriage 119 to any given preselected range of motion of the transducer secondary winding 57 effected by a given range of differential pressures to be measured by the capsule 10.

The cam structure 127 includes a projecting arm 174 having oppositely directed coaxial mating conical bores 175 in which one end of the cam rod 126 is supported by a snug fit permitting a small amount of lateral deflection of the latter along its length for a purpose presently to be explained. A fine or vernier manual control over the span adjustment just above is provided by supporting the other end of the cam rod 126 in similar oppositely directed conical bores 176 provided in a rectangular block 177 formed on the end of a shouldered stem 178 which has a sliding fit with a transverse aperture 179 provided at the end of the cam structure 127 as shown. The cam rod 126 is secured in position in the bores 176 by a set screw 180, and the cam structure 127 is provided with an end slot 181 just sufficiently wide to provide a sliding fit with a spanner nut 182 threaded onto a threaded end portion 183 of the stem 178. The spanner nut 182 has four centrally located and radially extending cylindrical holes spaced apart at 90° angles to receive the cylindrical nose of an adjusting tool and by which the nut may be manually rotated to displace the stem 178 axially and thus provides a fine span adjustment of the angle which the cam rod 126 makes with the direction of movement of the carriage 119. The stem 178 is secured in adjusted axial position by a set screw 184 threaded through the cam structure 127 to engage the waist portion of the stem 178 between its shouldered portions.

In practice, it is often found that the device which is responsive to the condition to be indicated exhibits a non-linearity characteristic in that the indications of the indicator element operated by the device do not bear a linear relation to equal-value changes of the condition indicated. In the indicator element follower structure of the present invention, the cam structure 127 could be provided with a cam surface engaged by the cam follower arm 103 and appropriately contoured to compensate for non-linearities of the type last mentioned thus to change a non-linear input to a resultant linear output allowing use in the structure of a mechanical counter such as the counter 169 so that direct read out (i.e., of differential pressures in the particular application herein described) in unit values can be ascertained without the use of correction charts or formulae. The cam structure 127 herein shown, however, enables such non-linearity compensation to be easily and readily effected as between one application of the following structure and another. It also permits easily effected linear adjustment at any time to correct for changes which might occur in the overall follower structure and associated servo system or to compensate for a specific operational condition such as inaccuracies in forming the threads of the lead screw 142. While the cam structure 127 herein shown is one particularly useful in compensating for non-linearities of the types mentioned, it will be appreciated that the cam structure may be provided with a characterized cam surface converting linear indications of the indicator element to square root or other desired non-linear output indications of the counter 169.

Considering now more particularly the features of construction of the cam structure 127 which permit easily and readily effected compensation of non-linearities of the types just mentioned, the structure 127 is provided with a longitudinal edge slot 187 and a longitudinal slot 188 normal to the edge slot and terminating at one end in a cylindrical bore 189. Received within these slots are one or more compensation adjustment assemblies 190 which may be adjustably spaced along the cam rod 126 and which serve to provide adjustable lateral deflections of the latter from linearity, such deflections being selectable in either inward or outward direction at each adjustment point while retaining the axis of the cam rod 126 in the median plane of the edge slot 187. Each such adjustment assembly 190 includes a spanner nut 191 having a width such as to be received with a close sliding fit within the slot 188 and provided, as shown more clearly in FIG. 9, with concentric end shoulders 192 which are received with a close sliding fit in the edge slot 187. The spanner nuts 191 are inserted into the slots 187 and 188 through the bore 189 and are threaded upon the threaded shanks 193 of adjusting members 194 having enlarged flat heads 195 with end C notches 196 through which the cam rod 126 is inserted at the time of its assembly into position in the projeciton 174 and block 177. It will be evident that, by positioning the assemblies 190 at selected points along the cam rod 126 and by manual rotational adjustment of each spanner nut 191 of the adjustment assemblies 190, the surface of the cam rod 126 in engagement with the cylindrical end portion 122 of a cam follower arm 103 may be given any desired linear or non-linear configuration along its length to provide the desired non-linear compensation. Since the contour of the cam rod 126 determines the calibration of the follower structure, any uneven wear of the surface of the cam rod would introduce a linearity error. To preclude this, the cam rod 126 is hardened while the cylindrical end portion 122 of the cam follower arm 103 is fabricated of a softer metal so that any wear occurs on the follower arm end portion 122 and accordingly results only in an easily corrected shift of the zero calibration point.

FIG. 10 schematically shows a representative servo system utilizing the indicator element follower structure of the invention. In considering the arrangement and operation of this system, assume that the capsule 10 initially positions the secondary winding 57 of the transducer 58 in the plane of symmetry of the air-gap magnetic fields produced by the transducer primary windings 70 and 71 which are indicated as electrically connected in series with one another to provide opposing magnetic fields upon energization of these windings through a voltage step-down transformer 200 by alternating current supplied to input terminals 201. Under this assumed condition, no alternating voltage is induced in the secondary winding 57 and the servo system is quiescent. Assume now that the capsule 10 in responding to a change of the differential pressure of a gas or vapor supplied through the tubes 40 and 45 effects movement of the transducer secondary winding 57 more fully into one of the air-gap magnetic fields. This new positioning of the secondary winding 57 induces a voltage in it which is thereupon supplied through the conductors 62 to an electrical servo unit 202. The latter may be of any conventional type, but preferably is one of the type disclosed and claimed in the Booth application Ser. No. 672,225 filed concurrently herewith and assigned to the same assignee as the present application. The servo unit 202 responds to the voltage supplied through the conductors 62 to effect energization of the motor 171 with a magnitude of energization varying with the amplitude of the voltage induced in the secondary winding 57 and with a polarity or phase of energization varying with the relative phase of the voltage induced in the secondary winding 57. This energization of the motor 171 causes it to begin rotational drive of the lead screw 142 through the gearing 161–166 and pulley 167 to effect linear displacement of the carriage 119 along the ways 120 and 121. The resultant linear displacement of the cam rod 126 pivots the cam follower arm 103 about the flexure axis of the pairs of cross-flexure springs 107 and 108, and the resultant rotation of the cross bar 104 is transmitted through the spring members 113 to move the magnetic structure of the transducer 58. The direction of rotation of the motor 171 under controlled energization of the servo unit 202 is such that the magnetic structure of the transducer 58 follows the movement of the transducer secondary winding 57 as effected by the capsule 10. This follow motion of the transducer magnetic structure continues until the latter repositions its air-gap magnetic fields to a position of symmetry with the secondary winding 57 at which time the induced voltage in the latter decreases to zero to terminate further energization of the motor 171 by the servo unit 202. The system thereupon becomes quiescent. The distance over which the magnetic structure of the transducer 58 was moved is indicated by the digital count of the counter 169 as an indication of the displacement of the transducer secondary winding 57 by the capsule 10, thus indicating the magnitude of the assumed change of differential pressures. The system remains quiescent until the transducer secondary winding 57 is again moved by the capsule 10 in responding to a further increase or decrease of differential pressures, whereupon the system operates to effect follow motion of the magnetic structure of the transducer 58 in the manner described to follow such movement of the secondary winding 57 and thus cause the indicator 169 to indicate the value of such new change of differential pressures.

It will be apparent from the foregoing description of the invention that an indicator element follower structure emboding the invention is one of relatively simple and sturdy construction yet one characterized by high sensitivity of follower action by reason of the torque-arm step-down ratio of follower drive (i.e., of the magnetic structure of the transducer 58) by the cam follower arm 103. The operation of the follower structure is further characterized by consistent accuracy in repetitive follow operations performed in a sensitive manner and with high precision without the need for precision parts (other than the cam rod 126), the cross-flexure pivoting of the cam follower arm 103 being frictionless and free of lost motion and the spring-loaded anti-backlash structure between the lead screw 142 and cam carriage 119 minimizing lost motion in the reversible drive displacement of the latter. A follower structure embodying the invention has the further important advantage that small incremental movements of an indicator element, such as the secondary winding 57 of the transducer 58, may be followed without significant reaction upon or significant loading of the indicator element. In the particular application described, the latter fact minimizes hysteresis effects in the movable diaphragm 42 of the capsule 10 while the ability of the transducer 58 to detect very minute displacements of the transducer secondary winding 57 allows a smaller-than-normal input motion from the diaphragm 42 and thereby further minimizes hysteresis as well as improving the linearity of indication. Both span and input-output linearity adjustments, which may be desirable in each of various diverse applications using the invention may easily and readily be effected initially and at any time thereafter to correct for changes which might occur in the system. The follower structure of the invention has the additional advantage that the structure may be readily constructed to minimize any positional error otherwise occasioned by orientation of the structure in particular applications, in that the parallelogram spring support of the follow structure (such as the magnetic structure of the transducer 58) enables by selection of spring materials and parameters gravitational movement of the follow structure in the correct amount to follow corresponding gravitational movement of the indicator element (such as the secondary winding 57 of the transducer 58). The follower structure of the invention may also be constructed to have dynamic balance particularly in that the mass and thus center of gravity of the cam follower arm 103 above the flexure axis of the pairs of cross-flexure springs 107 and 108 may be readily balanced by the mass and thus center of gravity of the structural components below the flexure axis of the cross-flexure springs 107 and 108, thus providing a high degree of dynamic balance lessening the otherwise undesirable effect of shock and vibration to which the structure may be subjected in operation. The follower structure of the invention is basically a displacement measuring device providing amplification, modification and conversion of this displacement into a linear (or other desired non-linear) output which is digitally displayed and therefore is suitable for a wide range of applications such as the measurement of temperature, pressure, viscosity, physical dimensions and the like.

While a specific form of the invention has been described for purposes of illustration, it is contemplated that numerous changes may be made without departing from the spirit of the invention.

What is claimed is:

1. A structure for positionally following the motion of an indicator element comprising an indicator element linearly movable over a range of positions indicative within said range of the prevailing value of a condition to be indicated, a base member, a follower element for following said indicator element, means including longitudinally rigid elongated support members connecting said follower element and said base member for parallelogram laterally movable support of said follower element on said base member to permit essentially linear movement of said follower element in following said indicator element over said range of positions thereof, a cam follower arm and means for pivotally supporting said follower arm on said base member, a pair of longitudinally rigid members mechanically connected between said follower arm and said follower element for translating bi-directional pivotal movement of said follower arm to bi-directional linear movement of said follower element, a cam structure supported by said base member and providing an angled cam surface engaged by said follower arm and linearly movable to control the angle of pivotal displacement of said arm, reversible-direction drive means, for mechanically connecting said drive means to said cam structure for reversible-direction linear drive displacement of said cam surface thereof to effect by pivotal motion of said follower arm essentially linear positioning of said follower element in follow relation to said indicator element, and indicating means operated by said drive means for providing an indication of the prevailing position of said follower element to indicate the prevailing value of said condition.

2. A structure for positionally following the motion of an indicator element according to claim 1 wherein said means for supporting said follower element and said means for supporting said cam follower arm each include a common sub-base member which is supported on and in spaced relation to stid base member.

3. A structure for positionally following the motion of an indicator element according to claim 2 wherein said sub-base member is supported on said base member for limited pivotal motion about an axis parallel to said linear displacement of said cam surface, and wherein manual means is provided for manually pivotally adjusting the angular position of said sub-base member adjustably to position said follower element relative to at least one preselected calibration position of said indicator element.

4. A structure for positionally following the motion of an indicator element according to claim 3 wherein said cam follower arm is pivotally supported from said sub-base member by spaced pairs of cross-flexure springs providing pivotal motion of said follower arm about a frictionless immobile axis of flexure.

5. A structure for positionally following the motion of an indicator element according to claim 4 wherein said follower arm terminates at one end in a cylindrical end portion spring biased into engagement with said cam surface and is fixedly secured at its other end to a cross bar rotationally supported by said spaced pairs of cross-flexure springs.

6. A structure for positionally following the motion of an indicator element according to claim 5 wherein said longitudinally rigid members mechanically connected between said follower arm and said follower element are comprised by a pair of longitudinally rigid and laterally flexible spring members connecting said cross bar to said follower element.

7. A structure for positionally following the motion of an indicator element according to claim 1 wherein said follower element support members are comprised by spaced pairs of longitudinally and laterally rigid spring members each having flexible end portions.

8. A structure for positionally following the motion of an indicator element according to claim 1 wherein said cam structure includes a carriage supported for linear guided movement upon spaced and parallel ways supported by said base member and oriented normal to the median plane of pivotal motion of said follower arm.

9. A structure for positionally following the motion of an indicator element according to claim 8 wherein non-linear movement of said indicator element with changes of said condition to be indicated are corrected to linear indications of said indicating means by the longitudinal contour of said cam surface.

10. A structure for positionally following the motion of an indicator element according to claim 8 wherein said cam surface is provided on a cam member secured to said carriage and angularly adjustably positioned thereon to adjust a preselected range of linear movement of said follower element to correspond to a preselected range of positions of said indicator element.

11. A structure for positionally following the motion of an indicator element according to claim 8 wherein said means for mechanically connecting said drive means to said cam structure includes a lead screw rotationally journaled at one end by said base member for rotational drive by said drive means and having a length of its other end threaded through and supported by an internally threaded aperture of said carriage.

12. A structure for positionally following the motion of an indicator element according to claim 11 wherein the longitudinal position of said lead screw is fixed by an end thrust ball bearing engaging the planar surface of a member supported on said base member and said lead screw is spring biased into engagement with said thrust bearing to restrain said lead screw against longitudinal displacement.

13. A structure for positionally following the motion of an indicator element according to claim 12 wherein a spring-biased lost-motion take-up structure threadingly received on said lead screw and restrained against rotation by said carriage resiliently couples said lead screw and said carriage.

14. A structure for positionally following the motion of an indicator element comprising an indicator element linearly movable over a range of positions indicative within said range of the prevailing value of a condition to be indicated; a base member; a sub-base member supported on said base member for limited resilient, bending, pivotal motion about an axis essentially normal to the direction of movement of said indicator element; a follower element having a support member; means including spaced pairs of longitudinally rigid and laterally flexible elongated spring members connecting said support member and said sub-base member for parallelogram laterally movable support of said support member on said sub-base member to permit essentially linear movement of said follower element in following said indicator element over said range of positions thereof; manual means for pivotally adjusting the angular position of said sub-base member adjustably to position said follower element relative to at least one preselected calibration position of said indicator element; a cam follower arm pivotally supported from said sub-base member by spaced pairs of cross-flexure springs for pivotal motion of said arm about a frictionless immobile axis of flexure; a pair of longitudinally rigid and laterally flexible spring members connected between said arm and said support member for translating bi-directional pivotal movement of said arm to bi-directional linear movement of said follower element; a carriage guided for linear movement by ways supported by said base member and including a cam structure providing a cam surface angled to the direction of movement of said carriage; means for biasing said follower arm into engagement with said cam surface for control of the angle of pivotal displacement of said follower arm by linear motion of said cam surface; means for angularly adjusting said cam structure on said surface to adjust a preselected range of linear movement of said follower element to correspond to a preselected range of positions of said indicator element; reversible-direction drive means; means including a lead screw rotationally journaled by said base member and said carriage and restrained in a preselected longitudinal position by an end thrust bearing for mechanically connecting said drive means to said carriage to effect reversible-direction linear drive displacement of said cam surface and thereby produce by pivotal motion of said arm essentially linear positioning of said follower element in follow relation to said indicator element, and indicating means operated by said drive means for providing an indication of the prevailing position of said follower element to indicate the prevailing value of said condition.

References Cited

UNITED STATES PATENTS

| | | | |
|---|---|---|---|
| 3,091,122 | 5/1963 | Pike et al. | 73—398 |
| 3,108,213 | 10/1963 | Golder et al. | 340—187 X |
| 3,282,110 | 11/1966 | Weir et al. | 73—398 |
| 3,292,248 | 12/1966 | Weisler | 74—54 |

S. CLEMENT SWISHER, Primary Examiner

U.S. Cl. X.R.

73—398